United States Patent [19]

Stearns

[11] 4,145,876
[45] Mar. 27, 1979

[54] JET ENGINE FUEL FLOW TRANSFER VALVE

[75] Inventor: Charles F. Stearns, East Longmeadow, Mass.

[73] Assignee: United Technologies Corp., Hartford, Conn.

[21] Appl. No.: 827,648

[22] Filed: Aug. 25, 1977

[51] Int. Cl.² .............................................. F02C 9/08
[52] U.S. Cl. ............................. 60/39.28 R; 417/212; 417/300; 137/599
[58] Field of Search ............................. 417/212, 300; 60/39.28 R; 137/599, 110, 565

[56] References Cited

U.S. PATENT DOCUMENTS

| 3,085,397 | 4/1963 | Jubb | 60/39.28 R |
| 3,382,672 | 5/1968 | French | 60/59.28 R |
| 3,481,356 | 12/1969 | McQueen | 137/110 |

Primary Examiner—Alan Cohan
Attorney, Agent, or Firm—Charles A. Warren

[57] ABSTRACT

A transfer valve for a gas turbine fuel system by which to transfer fuel flow from the main control to the back-up control without allowing fuel flow transients in excess of the mismatch between the two controls.

11 Claims, 1 Drawing Figure

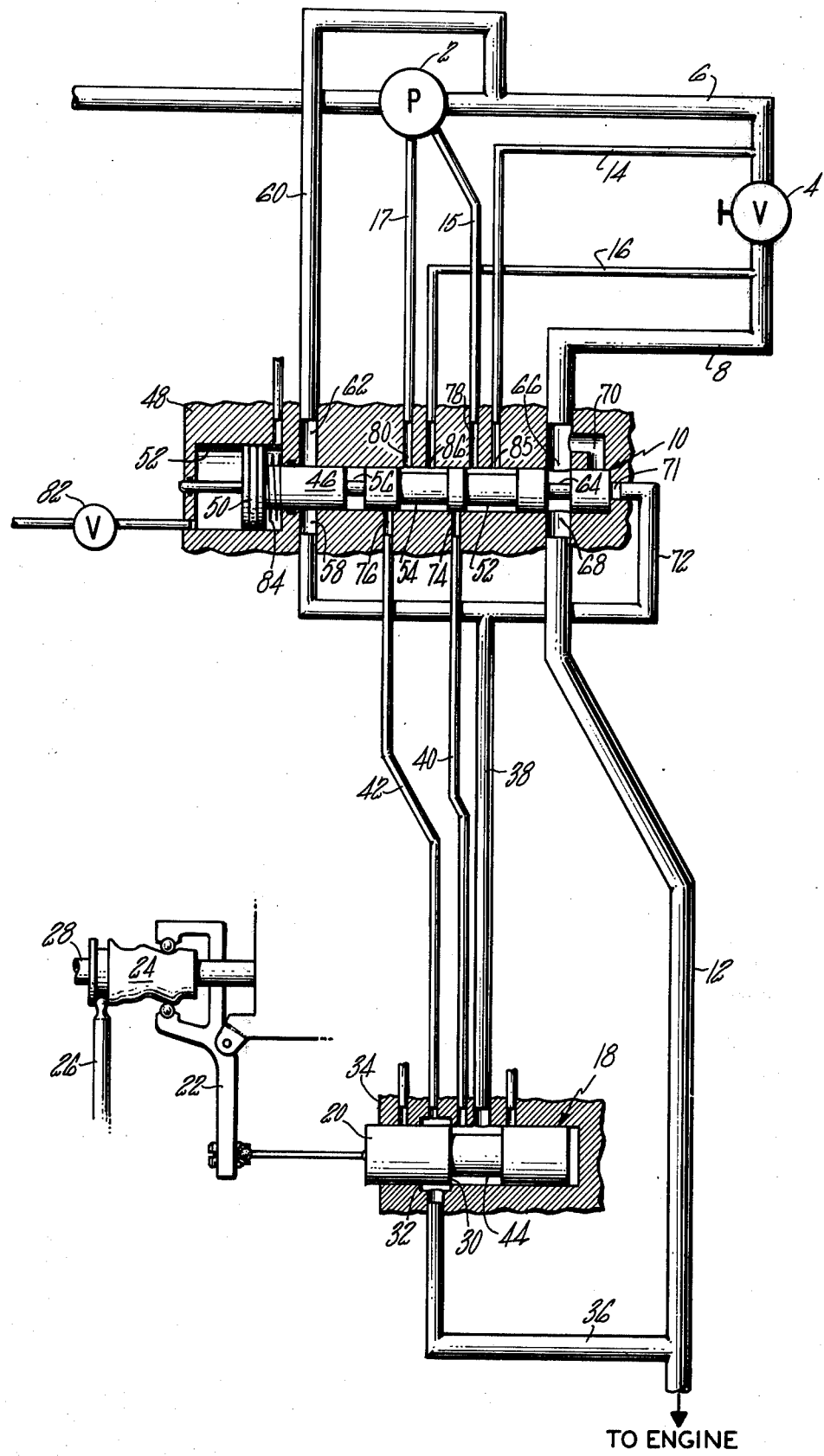

JET ENGINE FUEL FLOW TRANSFER VALVE

BACKGROUND OF THE INVENTION

When it becomes necessary to shift the fuel system from the main control to back-up control, as for example because of a malfunction in the main control, the transition may result in an excess of fuel if both controls are delivering fuel simultaneously or in a shortage of fuel if neither is supplying fuel. In either event, the result may be engine damage or failure. Where the fuel is supplied by a variable volume pump responsive to the pressure drop across the metering valve it is essential that the pressure signals reach the pump from the operative control during the transition from one control to the other as well as before and after the operation of the transfer valve by which the transition is made.

SUMMARY OF THE INVENTION

A feature of this invention is that transfer from the main control valve to the back-up valve occurs without allowing more than one control valve to meter the flow at any time during the transition. Another feature is the control of the pump supply such that the pump, which is responsive to the pressure drop across the metering or control valve, will receive the controlling pressure signals from the operative metering valve during as well as prior to and subsequent to the transition.

According to the invention the transfer valve is constructed, when actuated, to function in sequence to bypass the fuel from the main control through the back-up control, to shift the pump control pressures from the main metering valve to the back-up valve and to connect the back-up control valve directly to pump supply. The effect is always to have only one metering valve operative at one time and to have the pressure drop across this valve signaled directly to the fuel pump. In this way, the transition from one control valve to the other leaves no interval during which an excess of, or too little, fuel will be delivered to the engine.

The foregoing and other objects, features, and advantages of the present invention will become more apparent in the light of the following detailed description of preferred embodiments thereof as illustrated in the accompanying drawing.

BRIEF DESCRIPTION OF THE DRAWING

The single FIGURE is a schematic diagram of a fuel control system incorporating the invention.

DESCRIPTION OF THE PREFERRED EMBODIMENT

Referring first to FIG. 1, the fuel system for a gas turbine engine includes the main fuel control, a back-up control and a transfer valve by which to shift from one control to the other under the control of the pilot when a shift becomes necessary. This change from one control to the other desirably causes a minimum of disruption in the fuel delivered to the engine and this transfer valve is designed to accomplish this result.

Fuel is supplied from a variable volume pump 2, the volume of fuel delivered to the control system being controlled by pressure signals from points upstream and downstream of the operative fuel metering valve. The main control includes a metering valve 4 receiving fuel from the pump through a duct 6. Fuel from the metering valve is delivered through delivery duct 8 to the transfer valve 10, and from this valve through duct 12 to the engine. Under normal operation ducts 8 and 12 are directly connected by the transfer valve.

It will be understood that this main fuel system is shown only schematically; the metering valve is controlled by several variables such as engine rpm, any of several engine pressures, pilot lever angle, and/or other engine parameters. Such controls are well known and need not be described in detail. The upstream and downstream pressures on the metering valve are supplied to the pump through conduits 14 and 16 to the transfer valve and hence by conduits 15 and 17 to the pump. The transfer valve maintains a fluid connection between conduits 14 and 15 and between conduits 16 and 17 during normal operation of the main fuel control as will be described later. These pressures serve to control the quantity of fuel supplied by the pump to maintain a constant pressure drop across the valve. Such pumps and control systems are also well known; it is sufficient to note that the pump volume is controlled by these pressures to maintain the desired pressure drop across the metering valve whatever the setting of the metering valve.

The back-up fuel control includes the back-up metering valve 18, the position of the plunger 20 of which is controlled by any desired parameters such as pilot lever angle, engine speed, or engine pressure at a selected point in the engine. As shown the plunger 20 is moved through a lever 22 by a three dimensional cam 24, the angular position of which is controlled from the pilot control lever and the axial position of which is controlled from an engine pressure by a lever arm 26. The end of the shaft 28 for the cam may be connected to the pilot lever.

The plunger 20 includes a land 30 that controls the flow by more or less uncovering a port 32 in the casing 34 for the valve. This port is connected by a duct 36 to the engine fuel duct 12. Fuel reaches this back-up metering valve through a duct 38 from the transfer valve 10. This back-up valve has conduits 40 and 42 sensing the pressure upstream of the metering valve 18 and downstream of this metering valve, respectively. Specifically, the metering portion of the valve is the land 30 of the valve cooperating with the port 32. Conduit 40 is adjacent to and in fluid connection with the conduit 38 upstream of the metering valve by a groove 44 in the plunger 20 adjacent to the land 30. Conduit 42 communicates with the outlet port 32 in the valve and thus is downstream of the metering valve itself.

The transfer valve 10 has a plunger 46 in a casing 48, this plunger being normally held in the position shown by fluid pressure acting on an enlarged piston 50 on the left end of the plunger, this piston being in a cylinder 52 integral with the casing 48. The plunger has two adjacent grooves 52 and 54 therein that serve to connect the conduits 14 and 15 (groove 52) and the conduits 16 and 17 (groove 54). Thus as above stated, the pressure drop from the main metering valve 4 is transmitted through the transfer valve to the fuel pump by these grooves during normal operation of the system.

The transfer valve has another groove 56 therein normally offset from the port 58 for conduit 38 to the back-up valve. A supply pipe 60 from the pump conducts fuel to a port 62 in the casing 48 opposite to the port 58 so that when the plunger 46 is moved to the left to activate the back-up valve the groove 56 connects ports 58 and 62 directly.

During normal operation a groove 64 in the plunger 46 connects the port 66 for supply conduit 8 from the main metering valve and opposed port 68 for conduit 12 to the engine. When the transfer valve is moved to the left, plunger 46 closes both these ports. When this occurs a bypass duct 70 in the casing leads from port 66 to an adjacent port 71, normally closed by the plunger 46. Also, as the transfer plunger moves to the left to close port 66 this port 71 is uncovered and fluid is admitted to the casing at the end of the plunger. This space is connected by a duct 72 to the fuel conduit 38 to bypass the valve. This bypass thus permits full flow from the main metering valve to pass to the back-up metering valve even as the transfer valve begins to close ports 64 and 66.

The ports 74 and 76 in the transfer casing 48 for the pressure conduits 40 and 42 from the back-up control are located to the left of the cooperating ports 78 and 80 for conduits 15 and 17 and are normally closed by the transfer plunger. When this plunger is in its left position, the grooves 52 and 54 connect ports 74 and 78 (groove 52) and ports 76 and 80 (groove 54). At this time, the fluid connections from conduit 14 to conduit 15 and from conduit 16 to conduit 17 are cut off by plunger 46.

Movement of the transfer valve plunger 46 to the left for transfer of fuel flow from the main control to the back-up control is caused by venting the left side of piston 50 as by a vent valve 82 in a pressure conduit to this cylinder. This valve is under the control of the pilot by any suitable means or it may be otherwise controlled. For the purpose of this invention, venting cylinder 52 on the left side of the plunger permits the plunger to move to the left under the influence of the spring 84 acting on the piston 50.

In addition to the action of spring 84, the plunger is also urged toward the left by pressure in conduits 38 and 72. Normal leakage around the plunger from conduit 60 which is full of fuel under pressure when the pump is operating keeps conduit 38 also full of fuel and also under pressure so that the back-up system will always be full of fuel and ready for immediate functioning when necessary. Thus when pressure on the left end of piston 50 drops to cause movement of plunger to the left, the pressure in ducts 38 and 72 acting on the end of the plunger assists the action of spring 84. As soon as the plunger movement uncovers port 71 for bypass conduit 70 pressure from the conduit 8 also acts on the end of the plunger.

As the plunger begins its left movement the flow from the main control valve 4 begins to be cut off by closing of ports 64 and 66. At the same time, bypass 70 beings to open to divert the flow from the main metering valve through the back-up control valve 18 through conduit 38 rather than the flow going directly to the engine through conduit 12. The main metering valve is still controlling the flow and does so until the pressure taps are switched but the flow from this main valve being diverted through the back-up metering valve cannot exceed the quantity set by the main metering valve.

After the flow from the main metering valve is completely diverted to the back-up valve (the ports 66 and 68 closed and the bypass 70 open), continued movement of plunger 46 to the left connects the pump control pressures from the main control valve to the back-up control valve by the grooves 52 and 54 connecting ports 74 and 78 and the ports 76 and 80 so that the fuel pump is then controlled by the pressure drop across the back-up metering valve. At this time, as is apparent, the control of fuel flow is by this back-up metering valve, the flow through conduit 12 being cut off.

At the same time that ports 74 and 76 are opened, the ports 85 and 86 for conduits 14 and 16 from the main metering valve are closed by the plunger. These grooves 52 and 54 are so precisely located that the upstream and downstream pressures are switched simultaneously, that is to say ports 74 and 76 are opened and ports 85 and 86 are closed all at the same time.

After these pump control pressures are switched, continued movement of plunger 46 to the left connects ports 58 and 62 so that fuel from the pump is then passed directly through the transfer valve to the back-up control valve and the main control valve is inactivated. Whatever position the main metering valve takes will not now affect the supply of fuel to the engine as all the fuel now reaching the engine goes through the back-up control.

It will be understood that the described sequence of events as the transfer valve is moved occurs in a very short time, for example under a second. Even for this short interval, however, the sequence established by the transfer valve makes sure that the proper quantity of fuel continues to reach the engine and that the fuel supply pump is properly controlled through and after the transfer operation. The transfer valve movement may be instigated by other control than that of the pilot and mechanism may be provided to lock the transfer plunger in each end position. Such mechanism is not a part of the present invention and need not be described as such devices are well known. The particular actuators for the main control valve and the back-up valve are not described since they do not affect the functioning of the transfer valve. It is sufficient to note that either control valve may be any of several commercial valves in which the quantity of fuel to the engine is supplied by a variable volume pump with the pump output adjusted to maintain a constant or preselected pressure drop across the metering orifice, the pump output being responsive to this pressure drop.

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of my invention, that which I claim as new and desire to secure by Letters Patent of the United States is:

1. In a fuel system for a turbine engine,
   a main control including a metering valve,
   a back-up control including a metering valve,
   a variable volume fuel pump responsive to a pressure differential and connected to both controls for supplying fuel to both controls,
   pressure sensing means on opposite sides of each metering valve to sense the pressure differential and connections from said means to the pump and
   a transfer valve for shifting from the main control to the back-up control when necessary, said transfer valve operating to cause in sequence, a diversion of the fuel flow from the main metering valve through the back-up metering valve, a transfer of the pressure sensing connections from the main metering valve to the back-up metering valve, and a direct connection of the pump to the back-up valve.

2. A fuel system as in claim 1 in which the pump volume is responsive to the pressure sensing means for supplying fuel to the operative metering valve to maintain a selected pressure drop across this valve.

3. A fuel system as in claim 1 in which the transfer valve is held in a position for the main metering valve to operate by fluid pressure, and including a vent valve for dropping this pressure.

4. A fuel system as in claim 3 in which a spring acts on the plunger to cause its movement when the fluid pressure acting thereon is dropped.

5. A fuel system as in claim 1 including a fluid connection from the downstream side of the main metering valve through the transfer valve to the engine and another fluid connection from the pump through the transfer valve to the upstream side of the back-up metering valve.

6. A fuel system as in claim 5 including a fuel connection directly from the transfer valve to the engine, this connection being closed by the transfer valve when the connection to the back-up control is opened by movement of the transfer valve.

7. A fuel system for a gas turbine engine including,
a fuel pump the volume of which is controlled in response to a pressure differential,
a main control having a metering valve, and means for sensing the pressure differential across this valve,
a back-up control having a metering valve, and means for sensing the pressure differential across this valve,
a transfer valve by which to shift the fuel supply to the engine from the main control to the back-up control,
fuel supply connections from the pump to the controls, the connection to the back-up control passing through and controlled by the transfer valve,
a fuel connection from the main metering valve to the engine, this connection passing through and controlled by the transfer valve,
pressure differential transfer connections from each metering valve through the transfer valve to the pump, to control the pump output in response to the pressure differential,
said transfer valve being movable to transfer fuel control from the main control to the back-up control, this movement of the valve causing, in sequence, bypassing the fuel flow from the main metering valve through the back-up valve and cutting off direct flow from the main metering valve to the engine, shifting of the pressure transfer connections to the pump from the main metering valve to the back-up metering valve and opening of the connection from the pump to the back-up control.

8. A fuel system as in claim 7 in which the transfer valve is a plunger valve, having associated therewith fluid pressure means for holding the transfer valve in a position to have the main metering valve operative.

9. A fuel system as in claim 8 in which a spring acts on the plunger to move it in the transfer sequence.

10. A fuel system as in claim 7 in which the transfer valve having bypassed the flow from the main metering valve through the back-up valve cut off direct flow from this valve to the engine, maintains this bypass connection open throughout the transfer sequence.

11. A fuel system as in claim 8 in which the pressure transfer connections from the metering valves through the transfer valve to the pump are arranged to be shifted simultaneously from the main valve to the back-up valve as the transfer valve operates, and this shifting occurs only after the fuel from the main metering valve is all bypassed through the back-up valve.

* * * * *